United States Patent
Sakai et al.

[11] Patent Number: 5,846,674
[45] Date of Patent: Dec. 8, 1998

[54] ELECTRODE FOR RECHARGEABLE BATTERY WITH NONAQUEOUS ELECTROLYTE AND PROCESS FOR PRODUCING THE SAME

[75] Inventors: Shigeru Sakai; Toru Mangahara, both of Iwaki; Kazuo Umeda, Tokyo-To; Kiyoshi Oguchi, Tokyo-To; Mitsuru Tsuchiya, Tokyo-To, all of Japan

[73] Assignees: Furukawa Denchi Kabushiki Kaisha; Dai Nippon Printing Co., Ltd., both of Japan

[21] Appl. No.: 879,602

[22] Filed: Jun. 20, 1997

Related U.S. Application Data

[63] Continuation of Ser. No. 582,098, Jan. 2, 1996, abandoned, which is a continuation of Ser. No. 209,644, Mar. 14, 1994, abandoned.

[30] Foreign Application Priority Data

Mar. 16, 1993  [JP]  Japan .................................. 5-081228

[51] Int. Cl.⁶ ............................. H01M 4/62; H01M 10/40
[52] U.S. Cl. .......................... 429/218; 429/194; 29/623.5
[58] Field of Search .................................. 429/194, 218; 29/623.5

[56] References Cited

U.S. PATENT DOCUMENTS

| | | | |
|---|---|---|---|
| 4,228,226 | 10/1980 | Christian et al. | 429/194 |
| 4,530,890 | 7/1985 | Rampel | 429/217 |
| 4,689,880 | 9/1987 | Brezillon et al. | 29/623.5 |
| 4,830,939 | 5/1989 | Lee et al. | 429/192 |
| 4,888,259 | 12/1989 | Ebner | 420/217 |
| 4,925,751 | 5/1990 | Shackle et al. | 429/191 |
| 4,983,476 | 1/1991 | Slane | 429/197 |
| 5,030,527 | 7/1991 | Carpio et al. | 29/623.5 |
| 5,219,680 | 6/1993 | Fauteux | 429/192 |
| 5,232,795 | 8/1993 | Simon et al. | 429/192 |
| 5,240,790 | 8/1993 | Chua et al. | 429/190 |
| 5,429,890 | 7/1995 | Pynenburg et al. | 429/192 |
| 5,453,335 | 9/1995 | Fauteux et al. | 429/192 |

FOREIGN PATENT DOCUMENTS

| | | | |
|---|---|---|---|
| 0385802 | 9/1990 | European Pat. Off. | |
| 0606533 | 7/1994 | European Pat. Off. | |
| 0610071 | 8/1994 | European Pat. Off. | |
| 228398A1 | 9/1985 | Germany | 429/217 |
| WO94/15374 | 7/1994 | WIPO | |

OTHER PUBLICATIONS

Mizushima et al., "LixCoO2: A New Cathode Material for Batteries of High Energy Density" Mat. Res. Bull., vol. 15, pp. 783–789 (no month), 1980.

Chemical Abstracts, vol. 116, No. 6, Feb. 10, 1992, Columbus, Ohio, US Abstract No. 44154w.

Chemical Abstracts, vol. 117, No. 14, Oct. 5, 1992, Columbus, Ohio, US Abstract No. 134508q.

Chemicai Abstracts, vol. 116, No. 12, Mar. 23, 1992, Columbus, Ohio, US Abstract No. 110133s.

*Primary Examiner*—Prince Willis, Jr.
*Assistant Examiner*—Carol Chaney
*Attorney, Agent, or Firm*—Parkhurst & Wendel, L.L.P.

[57] ABSTRACT

An electrode for a rechargeable battery with a nonaqueous electrolyte is provided wherein the active material layer has a sufficient flexibility, the adhesion between the active material coating and the metal foil collector is good, none of peeling, falling, cracking and other unfavorable phenomena occur in the active material coating in the step of assembling a battery and excellent discharge characteristics can be developed. The electrode for a rechargeable battery with a nonaqueous electrolyte comprises a metal foil collector and, formed on at least a part of the metal foil collector, an active material layer comprising an active material and a cured reaction-curing binder as essential components.

19 Claims, 2 Drawing Sheets

ELECTRODE FOR RECHARGEABLE BATTERY WITH NONAQUEOUS ELECTROLYTE AND PROCESS FOR PRODUCING THE SAME

This is a Continuation of application Ser. No. 08/582,098 filed Jan. 2, 1996, now abandoned, which is in turn a continuation of Ser. No. 08/209,644 filed Mar. 14, 1994, now abandoned.

BACKGROUND OF THE INVENTION

The present invention relates to an electrode for rechargeable batteries with a nonaqueous electrolyte represented by lithium ion rechargeable batteries and a process for producing the same. More particularly, it is concerned with an electrode for a rechargeable battery with a nonaqueous electrolyte, which causes none of peeling, falling, cracking and other unfavorable phenomena in an active material coating in the step of assembling a battery and other steps and can develop excellent discharge characteristics, and a process for producing the same.

A rapid advance of a reduction in size and a reduction in weight of electronic equipment and communication equipment in recent years has led to a demand for a reduction in size and a reduction in weight of rechargeable batteries used as a driving power source in these equipment, and rechargeable batteries with a nonaqueous electrolyte represented by lithium ion rechargeable batteries having a high energy density and a high voltage have been substituted for alkaline batteries.

In electrode sheets (plates) having a large effect on the performance of the rechargeable batteries, an attempt to increase the area has been made by reducing the thickness of the electrodes for the purpose of increasing the current density.

In order to meet the above demands, for example, Japanese Patent Laid-Open No. 10466/1988 and Japanese Patent Laid-Open No. 285262/1991 propose an electrode for a positive electrode. This electrode is produced by adding a conductive agent, a binder and optionally suitable additives, such as a wetting agent, to a powder of an active material for a positive electrode, such as a metal oxide, a sulfide or a halide, to prepare an active material coating agent in a paste form and forming a coating of the active material coating agent, that is, an active material coating, on a metal foil collector.

In the electrode comprising a metal foil collector and, formed thereon, a coating comprising an active material coating agent, that is, an active material coating, the binder for the active material coating agent should be electrochemically stable against nonaqueous electrolytes, particularly against organic solvents, should not be eluted into the electrolytes and should be flexible enough to prevent peeling, falling, cracking and other unfavorable phenomena during the step of assembling a battery using the active material coating and an excellent adhesion to the metal foil collector.

In the conventional electrode comprising a metal foil collector and, formed thereon, an active material coating, the binder in the active material coating agent comprises a fluororesin, such as polytetrafluoroethylene or polyvinylidene fluoride, a silicone/acrylic copolymer or other materials.

According to the finding of the present inventors, the flexibility of the active material coatings using these binders are so unsatisfactory that unfavorable phenomena, such as peeling, falling and cracking, are likely to occur in the step of assembling a battery using electrodes, which renders discharge characteristics of the battery unstable.

Further, since the active material in the coating is susceptible to a structural change due to absorbed water, electrodes should be heat-dried to a high temperature of 200° C. or above prior to assembling of a battery using the electrodes. At that time, the active material coatings in the conventional electrodes are likely to soften due to the heat, which unfavorably causes problems such as a lowering in adhesion between the metal foil collector and the active material coating and occurrence of peeling and falling.

In view of the above-described problems of the prior art, the present invention has been made, and an object of the present invention is to provide electrodes for a rechargeable battery with a nonaqueous electrolyte, in which the active material coating (active material layer) has a satisfactory flexibility, the adhesion between the active material coating and the metal foil collector is good, none of peeling, falling, cracking and other unfavorable phenomena occur in the step of assembling a battery and other steps and excellent discharge characteristics can be developed, and a process for producing the electrode for a rechargeable battery with a nonaqueous electrolyte in an easy and efficient manner.

DISCLOSURE OF THE INVENTION

According to one aspect of the present invention, an electrode for a rechargeable battery having a nonaqueous electrolyte is provided, the electrode comprising a metal foil collector and, formed on at least a part of said metal foil collector, an active material layer (an active material coating) comprising an active material and a cured reaction-curing binder as essential components.

According to another aspect of the present invention, there is provided a process for producing an electrode for a rechargeable battery with a nonaqueous electrolyte, comprising the steps of: coating a composition comprising an active material and a reaction-curing binder as essential components onto at least part of a metal foil collector; and curing the binder in the composition coated on the metal foil collector to form an active material layer on the metal foil collector.

BEST MODE FOR CARRYING OUT THE INVENTION

Figure 1:
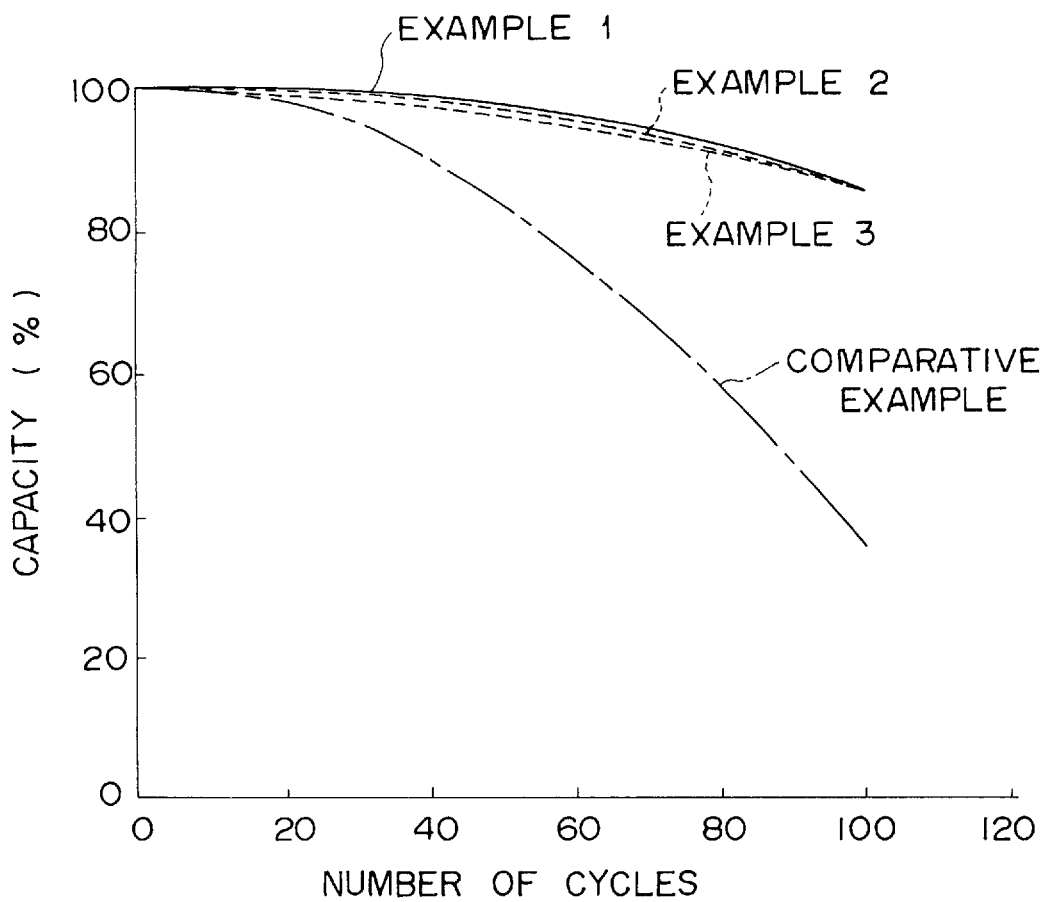
FIG. 1 is a plot of the average value of discharge capacities for 20 cells for each battery constructed using electrodes prepared in Example 1, Example 2, Example 3 and Comparative Example as a function of the number of cycles.
Figure 2:
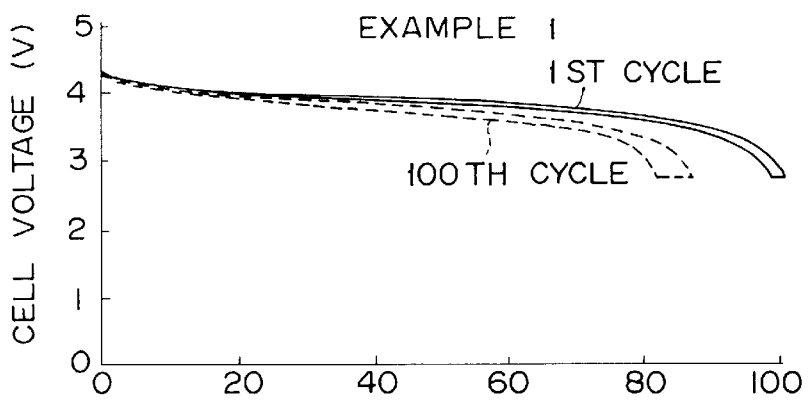
FIG. 2 is a discharge characteristic curve in the 1st and 100th cycles in Example 1.
Figure 3:
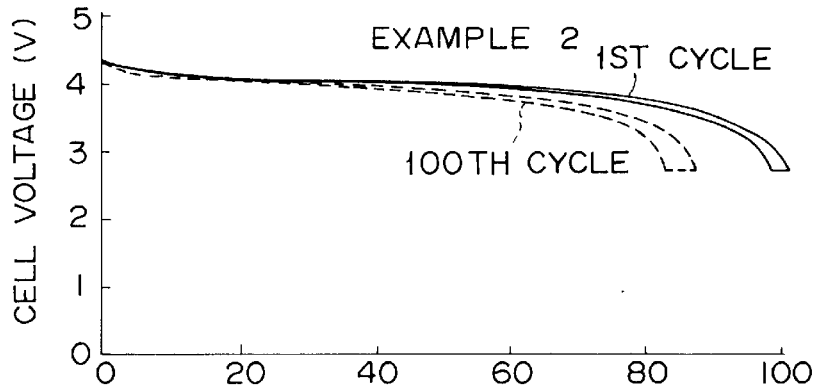
FIG. 3 is a discharge characteristic curve in the 1st and 100th cycles in Example 2.
Figure 4:
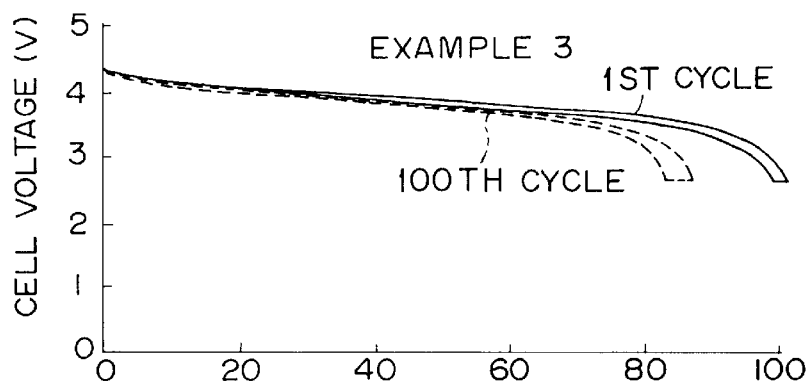
FIG. 4 is a discharge characteristic curve in the 1st and 100th cycles in Example 3.
Figure 5:
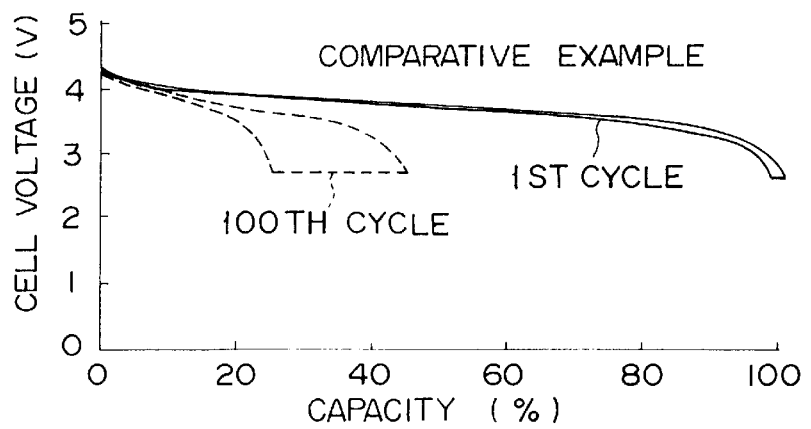
FIG. 5 is a discharge characteristic curve in the 1st and 100th cycles in Comparative Example.

In the electrode having the above-described constitution for a rechargeable battery with a nonaqueous electrolyte and the process for producing the same, the rechargeable battery with a nonaqueous electrolyte comprises, for example, a lithium-based rechargeable battery.

The metal foil collector, on which an active material layer is to be formed, may comprise a metal foil of aluminum, copper, stainless steel or the like.

The composition for forming the active material layer comprises an active material and a reaction-curing binder as essential components. Further, the composition may be in a form produced by optionally adding a solvent to the above composition and effecting kneading or dispersing. The composition preferably contains as a conductive agent graphite, carbon black, acetylene black or other material. However, no conductive agent is necessary when the active material is conductive (electronically conductive).

Examples of the active material for a positive electrode in the electrode for a rechargeable battery with a nonaqueous electrolyte include one member or a combination of a plurality of members selected from lithium oxides, such as $LiMO_2$ (wherein M=Co, Ni, Mn or the like) and $LiMn_2O_4$, and chalcogen compounds, such as $TiS_2$, $MnO_2$, $MoO_3$ and $V_2O_5$. A high discharge voltage of about 4 V can be provided when $LiCoO_2$ is used as the active material for a positive electrode.

Not only lithium and lithium alloys but also carbonaceous materials, such as graphite, carbon black and acetylene black, may be preferably used as the active material for a negative electrode.

The reaction-curing binder contained in the composition for the active material layer remains substantially unreactive in the step of coating the composition for the active material layer on the metal foil collector and is reacted and cured upon heating treatment or ionizing radiation irradiation treatment after coating to form a cured active material layer.

The reaction-curing binder is composed mainly of a thermosetting and/or ionization-radiation-curing prepolymer, oligomer or monomer (including a curing agent).

Examples of the thermosetting binder include one member or a combination of a plurality of members selected from prepolymers, oligomers and monomers (curing agents) of urethane, epoxy, melamine, phenol/formaldehyde, amide, urea, acrylic and other reaction systems. In the application of the composition, the binder may be used in combination with optional suitable additives such as polymerization initiators and catalysts.

For example, in the case of the urethane thermosetting binder, it is preferred to use a combination of a polyol compound, such as polyethylene glycol or polycaprolactone, with a polyisocyanate compound, such as toluene diisocyanate, diphenylmethane diisocyanate, 1,6-hexanediol diisocyanate, isophorone diisocyanate, xylene diisocyanate or their derivatives or polymers thereof. In the case of the epoxy thermosetting binder, it is preferred to use a combination of a polyglycidyl compound with a polycarboxyl compound, a polyamine compound or the like.

Prepolymers, oligomers, monomers, etc. of (metha) acryloyl compounds, allyl compounds, vinyl compounds and other compounds, which are reactive with radiations, such as ultraviolet rays, electron beams and γ rays, are utilized as the ionizing-radiation-curing binder, and examples thereof include prepolymers and oligomers of urethane (meth)acrylate, epoxy (meth)acrylate and polyester (meth)acrylate, and monofunctional and polyfunctional monomers, such as styrene, (meth)acrylic acid, methyl (meth)acrylate, butyl (meth)acrylate, 2-hydroxyethyl acrylate, ethylene glycol diacrylate, diethylene glycol diacrylate, hexamethylene glycol diacrylate, neopentyl glycol diacrylate, ethylene glycol diglycidyl ether diacrylate, diethylene glycol diglycidyl ether acrylate, hexamethylene glycol diglycidyl ether diacrylate, neopentyl glycol diglycidyl ether diacrylate, trimethylolpropane triacrylate, pentaerythritol triacrylate, pentaerythritol tetraacrylate, dipentaerythritol pentaacrylate and dipentaerythritol hexaacrylate. They may be used alone or in the form of a combination of two or more of them. When ultraviolet rays are used as curing means, it is preferred to incorporate a photopolymerization initiator in the binder.

A further improvement in adhesion of the active material layer to the metal foil collector or heat resistance, mechanical strength and other properties can be attained by using as the reaction-curing binder a combination of a thermosetting binder with an ionizing-radiation-curing binder.

In this case, the thermosetting binder may be used in combination with the ionizing-radiation-curing binder in such a manner that (1) a thermosetting binder and an ionizing-radiation-curing binder are mixed with each other or (2) a binder having in its molecules a functional group reactive with ionizing radiations, such as a (meth)acryloyl group, an allyl group, a vinyl group or a glycidyl group, and the above-described prepolymer, oligomer or monomer. For example, when a thermosetting oligomer having a functional group reactive with ionizing radiations is a urethane oligomer, examples thereof include a compound prepared by previously reacting a part of an isocyanate group in a polyisocyanate compound with a (meth)acryloyl compound having a functional group reactive with the isocyanate, such as a hydroxyl group or an amino group. However, the present invention is not limited to the above-described examples only.

Further, addition of thermoplastic resins, such as polyester resin, polyamide resin, polyacrylic ester resin, polyurethane resin, cellulosic resin, polyolefin resin and fluororesin, waxes, surfactants, etc. to the composition contributes to an improvement in stability and coatability of the composition and adhesion, heat resistance, mechanical properties and other properties of the resultant active material layer.

The active material content based on the composition is preferably in the range of from 70 to 99.5% by weight, still preferably in the range of from 80 to 95% by weight. On the other hand, the reaction-curing binder content is preferably in the range of from 0.5 to 30% by weight, still preferably in the range of from 5 to 20% by weight.

The composition for forming the active material layer can be prepared by mixing and dispersing a composition comprising a powdery active material and a reaction-curing binder and, optionally added thereto, a conductive agent and a solvent by means of a homogenizer, a ball mill, a sand mill, a roll mill or the like.

The composition can be applied onto the metal foil collector, for example, by gravure coating, gravure reverse coating, roll coating, Meyer bar coating, blade coating, knife coating, air knife coating, Komma coating, slot die coating, slide die coating, dip coating or other coating methods. The thickness on a dry basis of the active material layer formed on the metal foil collector is preferably in the range of from about 10 to 200 μm, still preferably in the range of from about 50 to 150 μm. The thickness of the active material may be properly selected depending upon desired characteristics of the battery from the viewpoint of volumetric efficiency, weight efficiency per unit area and prevention of cracking.

If necessary, the solvent is removed after the composition is coated on the metal foil collector, and the binder in the composition is then cured. The step of curing the binder is effected by a heat treatment in a drier or an electric furnace or an ionizing radiation irradiation treatment using an UV lamp, an electron beam irradiation device, a γ-ray irradiation device or the like depending upon the curing type of the binder.

After the binder in the composition is cured, the coated surface is preferably subjected to a treatment using a heat roll or a sheet press for the purpose of improving the homogeneity of the active material layer (coating).

It is preferred that the electrode be subjected to a heat treatment, a vacuum treatment or other treatment to remove water in the active material layer of the electrode before a battery is assembled using the resultant electrode.

When a rechargeable battery is prepared using the electrode prepared by the above process, the nonaqueous electrolyte used is an aprotic organic solvent, for example, ethylene carbonate, propylene carbonate, diethyl carbonate, 2-methyltetrahydrofuran or dimethoxyethane or a mixture of the above electrolyte with a supporting electrolyte, such as $LiCiO_4$, $LiPF_6$, $LiAsF_6$ or $LiBF_4$.

The electrode for a rechargeable battery with a nonaqueous electrolyte according to the present invention comprises a metal foil collector and, formed thereon, an active material film comprising an active material and a cured reaction-curing binder as essential components. In the electrode, the active material layer has an excellent flexibility, and in the step of assembling a battery using the electrode, none of peeling, falling, cracking and other unfavorable phenomena occur in the active material layer formed on the metal foil collector, which enables a rechargeable battery with a nonaqueous electrolyte having stable discharge characteristics to be produced.

EXAMPLES

The specific construction of the electrode for a rechargeable battery with a nonaqueous electrolyte according to the present invention and the results of evaluation of characteristics of batteries constructed using the electrode will now be described with reference to the following Examples.

Example 1

90 parts by weight of a $LiCoO_2$ powder having an average particle diameter of about 10 $\mu$m, 5 parts by weight of a graphite powder, 5 parts by weight of a urethane oligomer (Takenate A-270L manufactured by Takeda Chemical Industries, Ltd.) and 20 parts by weight of ethyl acetate were dispersed in one another by stirring in a homogenizer at 8000 rpm for 10 min to provide a coating agent for a positive electrode.

Separately, 90 parts by weight of a graphite powder, 10 parts by weight of a urethane oligomer (Takenate A-270L manufactured by Takeda Chemical Industries, Ltd.) and 30 parts by weight of ethyl acetate were dispersed in one another by stirring in a homogenizer at 8000 rpm for 10 min to provide a coating agent for a negative electrode.

Then, the coating agent for a positive electrode was coated on both surfaces of a collector comprising a 20 $\mu$m-thick aluminum foil by means of a slot die coater, and the coating agent for a negative electrode was coated on both surfaces of a collector comprising a 10 $\mu$m-thick copper foil by means of a slot die coater. The coated collectors were dried in an oven at 100° C. to remove the solvent, thereby providing about 100 $\mu$m-thick dried coatings.

Subsequently, the collectors having coatings were aged at 60° C. for 72 hr to cure the urethane oligomer in the coatings, thereby providing active material coatings.

Further, each collector having on its surfaces active material coatings was pressed with a heat roller press at 200° C. to homogenize the coatings, thereby providing intended electrodes for a rechargeable battery with a nonaqueous electrolyte.

The electrodes thus formed were heat-treated at 250° C. to remove water and used to assemble a rechargeable battery with a nonaqueous electrolyte. None of peeling, cracking, falling and other unfavorable phenomena occurred in the active material coatings of the electrodes in the step of assembling the battery. The percentage incidence of peeling, falling and cracking in the step of assembling the battery is shown in Table 1.

Example 2

90 parts by weight of a $LiCoO_2$ powder having an average particle diameter of about 10 $\mu$m, 5 parts by weight of a graphite powder, 4 parts by weight of a urethane acrylate oligomer (Shiko UV-4200B manufactured by Nippon Synthetic Chemical Industry Co., Ltd.), 1 part of an acrylic ester monomer (pentaerythritol triacrylate available from Nippon Kayaku Co., Ltd. under the trade name of Kayarad PET-30) and 20 parts of a mixed solvent comprising equal weights of methyl ethyl ketone and isopropyl alcohol were dispersed in one another by stirring in a homogenizer at 8000 rpm for 10 min to provide a coating agent for a positive electrode.

Separately, 90 parts by weight of a graphite powder, 8 parts of a urethane acrylate oligomer (Shiko UV-4200B manufactured by Nippon Synthetic Chemical Industry Co., Ltd.), 2 parts of an acrylic ester monomer (pentaerythritol triacrylate available from Nippon Kayaku Co., Ltd. under the trade name of Kayarad PET-30) and 30 parts of a mixed solvent comprising equal weights of methyl ethyl ketone and isopropyl alcohol were dispersed in one another by stirring in a homogenizer at 8000 rpm for 10 min to provide a coating agent for a negative electrode.

Then, the coating agent for a positive electrode was coated on both surfaces of a collector comprising a 20 $\mu$m-thick aluminum foil by means of a slot die coater, and the coating agent for a negative electrode was coated on both surfaces of a collector comprising a 10 $\mu$m-thick copper foil by means of a slot die coater. The coated collectors were dried in an oven at 100° C. to remove the solvent, thereby providing about 100 $\mu$m-thick dried coatings.

Subsequently, each collector on its both surfaces having a coating was irradiated with an electron beam of 5 Mrad at an accelerating voltage of 200 kV by using an electron beam irradiation device (Curetron manufactured by Nisshin High Voltage Co., Ltd.) to cure the oligomer in each dried coating, thereby curing the dried coatings.

Further, each collector having on its surfaces active material coatings was pressed with a heat roller press at 200° C. to homogenize the coatings, thereby providing intended electrodes for a rechargeable battery with a nonaqueous electrolyte.

The electrodes thus formed were heat-treated at 250° C. to remove water and used to assemble a rechargeable battery with a nonaqueous electrolyte. None of peeling, cracking, falling and other unfavorable phenomena occurred in the active material coatings of the electrodes in the step of assembling the battery. The percentage incidence of peeling, falling and cracking in the step of assembling the battery is shown in Table 1.

Example 3

90 parts by weight of a $LiCoO_2$ powder having an average particle diameter of about 10 $\mu$m, 5 parts by weight of a graphite powder, 3 parts by weight of a urethane oligomer (Takenate A-270L manufactured by Takeda Chemical Industries, Ltd.), 2 parts by weight of an acrylic ester monomer (trimethylolpropane triacrylate manufactured by Nippon Kayaku Co., Ltd. under the trade name of Kayarad TMPTA) and 30 parts of a mixed solvent comprising equal weights of methyl ethyl ketone and ethyl acetate were dispersed in one another by stirring in a homogenizer at 8000 rpm for 10 min to provide a coating agent for a positive electrode.

Separately, 90 parts by weight of a graphite powder, 8 parts of a urethane oligomer (Takenate A-270L manufactured by Takeda Chemical Industries, Ltd.), 2 parts by weight of an acrylic ester monomer (trimethylolpropane triacrylate available from Nippon Kayaku Co., Ltd. under the trade name of Kayarad TMPTA) and 30 parts of a mixed solvent comprising equal weights of methyl ethyl ketone and ethyl acetate were dispersed in one another by stirring in a homogenizer at 8000 rpm for 10 min to provide a coating agent for a negative electrode.

Then, the coating agent for a positive electrode was coated on both surfaces of a collector comprising a 20 $\mu$m-thick aluminum foil by means of a slot die coater, and the coating agent for a negative electrode was coated on both surfaces of a collector comprising a 10 $\mu$m-thick copper foil by means of a slot die coater. The coated collectors were dried in an oven at 100° C. to remove the solvent, thereby providing about 100 $\mu$m-thick dried coatings.

Subsequently, each collector on its both surfaces having a coating was irradiated with an electron beam of 5 Mrad at an accelerating voltage of 200 kV by using an electron beam irradiation device (Curetron manufactured by Nisshin High voltage Co., Ltd.) to cure the oligomer in each dried coating, thereby curing the dried coatings.

Further, each collector having on its surfaces active material coatings was pressed with a heat roller press at 200° C. to homogenize the coatings, thereby providing intended electrodes for a rechargeable battery with a nonaqueous electrolyte.

The electrodes thus formed were heat-treated at 250° C. to remove water and used to assemble a rechargeable battery with a nonaqueous electrolyte. None of peeling, cracking, falling and other unfavorable phenomena occurred in the active material coatings of the electrodes in the step of assembling the battery. The percentage incidence of peeling, falling and cracking during assembling of the battery is shown in Table 1.

Comparative Example 90 parts by weight of a LiCoO$_2$ powder having an average particle diameter of about 10 $\mu$m, 5 parts by weight of a graphite powder, 5 parts by weight of a polyvinylidene fluoride resin (Neoflon VDF manufactured by Daikin Industries, Ltd.) and 20 parts by weight of N-methylpyrrolidone were dispersed in one another by stirring in a homogenizer at 8000 rpm for 10 min to provide a coating agent for a positive electrode.

Separately, 90 parts by weight of a graphite powder, 10 parts by weight of a polyvinylidene fluoride resin (Neoflon VDF manufactured by Daikin Industries, Ltd.) and 30 parts by weight of N-methylpyrrolidone were dispersed in one another by stirring in a homogenizer at 8000 rpm for 10 min to provide a coating agent for a negative electrode.

Then, the coating agent for a positive electrode was coated on both surfaces of a collector comprising a 20 $\mu$m-thick aluminum foil by means of a slot die coater, and the coating agent for a negative electrode was coated on both surfaces of a collector comprising a 10 $\mu$m-thick copper foil by means of a slot die coater. The coated collectors were dried in an oven at 200° C. to remove the solvent, thereby providing about 100 $\mu$m-thick dried coatings.

Further, each collector having on its surfaces active material coatings was pressed with a heat roller press at 200° C. to homogenize the coatings, thereby providing comparative electrodes for a rechargeable battery with a nonaqueous electrolyte.

The electrodes thus formed were heat-treated at 250° C. to remove water and used to assemble a rechargeable battery with a nonaqueous electrolyte. As a result, peeling and cracking frequently occurred in the active material coatings of the electrodes. The percentage incidence of peeling, falling and cracking in the step of assembling the battery is shown in Table 1.

Characteristic Tests

Electrodes produced in Examples 1, 2 and 3 and Comparative Example were used, and a solution prepared by dissolving one mole of LiPF$_6$ as a supporting electrolyte in one liter of a mixed solvent comprising EC (ethylene carbonate), PC (propylene carbonate) and DME (dimethoxyethane) in a volume ratio of 1:1:2 were poured as an electrolyte to assemble batteries of size AA having a rated capacity of 500 mAh.

Battery characteristics were measured for 20 cells for each battery using a charge-discharge measuring device. Specifically, at the outset, charging was effected under constant voltage conditions at a maximum charge current of 1.0 mA/cm$^2$ until the cell voltage reached 4.3 V in the charge direction. The charging was then ceased for 10 min. Thereafter, discharging was effected under constant current conditions at the same current until the voltage reaches 2.75 V. The discharging was then ceased for 10 min. Thereafter, the above procedure was repeated 100 charge-discharge cycles to measure charge-discharge characteristics.

FIG. 1 shows a plot of the average value of discharge capacities for 20 cells for each battery constructed using electrodes prepared in Example 1, Example 2, Example 3 and Comparative Example as a function of the number of cycles. In all the cases, the average initial capacity value was presumed to be 100%. In the batteries using electrodes prepared in Example 1, Example 2 and Example 3, the average discharge capacity was maintained at about 85% or more even when the number of cycles exceeded 100. By contrast, the battery prepared in Comparative Example exhibited a significant lowering in capacity after the number of cycles exceeded 20 cycles, and the retention of the capacity was as low as about 35% when the number of cycles exceeded 100.

FIGS. 2 to 5 show discharge characteristic curves in the 1st and 100th cycles based on the results shown in FIG. 1. In all the cases, the average initial capacity was presumed to be 100%. In the batteries prepared using electrodes of Example 1, Example 2 and Example 3, the variation in capacity was not more than 5% even when the number of cycles exceeded 100, whereas in the battery prepared in Comparative Example, the variation was as large as about 20%.

After the charge-discharge cycle test, the batteries were dismantled, and the electrodes were removed and observed. As a result, as is apparent from Table 2, none of peeling, cracking, falling and other unfavorable phenomena occurred in the active material layer of the electrodes of the batteries prepared in Examples 1, 2 and 3. On the other hand, in the electrodes of the battery prepared in Comparative Example 1, there occurred unfavorable phenomena, such as peeling and cracking and falling in the active material layer, which were found to be mainly causative of a lowering in capacity and a variation in capacity.

TABLE 1

|  | Number of cells evaluated | Number of cells having damaged active layers | Incidence (%) |
|---|---|---|---|
| Ex. 1 | 100 | 1 | 1 |
| Ex. 2 | 100 | 1 | 1 |
| Ex. 3 | 100 | 1 | 1 |
| Com. Ex. | 100 | 12 | 12 |

TABLE 2

|  | Number of cells evaluated | Number of cells having damaged active layers | Incidence (%) |
|---|---|---|---|
| Ex. 1 | 20 | 0 | 0 |
| Ex. 2 | 20 | 0 | 0 |
| Ex. 3 | 20 | 0 | 0 |
| Com. Ex. | 20 | 5 | 25 |

In the electrode for a rechargeable battery with a non-aqueous electrolyte according to the present invention, the active material layer has a good flexibility, and the adhesion between the active material layer and the metal foil collector is good. Therefore, in the step of assembling a battery and other steps, none of peeling, cracking, falling and other unfavorable phenomena occur in the active material coating, and table discharge characteristics can be developed.

We claim:

1. A process for producing a rechargeable battery comprising an electrode with a reaction-cured binder and a non-aqueous liquid electrolyte system, said process comprising the steps of:

producing a first electrode by (i) coating a composition comprising an active material including a transition-metal lithium oxide and at least one reaction-curing binder onto at least part of a metal foil collector, (ii) curing said at least one reaction-curing binder in the composition coated on said metal foil collector to form an active material layer comprising said transition-metal lithium oxide on said metal foil collector, and (iii) removing water contained in said active material layer; and assembling the battery by providing the first electrode, a second electrode, and a non-aqueous liquid electrolyte system consisting of:

a solvent selected from the group consisting of ethylene carbonate, propylene carbonate, diethyl carbonate, 2-methyltetrahydrofuran, dimethyoxyethane, and mixtures thereof, and an electrolyte salt selected from the group consisting of LiClO$_4$, LiPF$_6$, LiAsF$_6$ and LiBF$_4$ in a casing, wherein the non-aqueous liquid electrolyte separates the first and second electrodes from each other.

2. A process according to claim 1, wherein said at least one cured reaction-curing binder comprises a thermoset binder.

3. A process according to claim 1, wherein said at least one reaction-curing binder comprises an ionizing-radiation-curing binder.

4. A process according to claim 1 wherein said at least one reaction-curing binder comprises a material from the groups consisting of: (i) a mixture of a thermoset binder and an ionizing-radiation-curing binder, and (ii) a thermoset binder having a molecular functional group that is reactive with ionizing radiation.

5. A process according to claim 1, wherein the water contained in the active material layer is removed by heating or vacuum treatment.

6. A process according to claim 1, wherein said nonaqueous liquid electrolyte consists essentially of a solution including a supporting electrolyte and a solvent.

7. A process according to claim 6, wherein said solvent comprises an aprotic organic solvent.

8. A process according to claim 6, wherein said supporting electrolyte comprises at least one component from the group consisting of LiPF$_6$, LiClO$_4$, LiAsF$_6$, and LiBF$_4$.

9. A lithium ion rechargeable battery comprising an electrode with a reaction-cured binder and a non-aqueous liquid electrolyte system, comprising: a positive electrode, a negative electrode, and a non-aqueous liquid electrolyte system consisting of:

a solvent selected from the group consisting of ethylene carbonate, propylene carbonate, diethyl carbonate, 2-methyltetrahydrofuran, dimethyoxyethane, and mixtures thereof, and an electrolyte salt selected from the group consisting of LiClO$_4$, LiPF$_6$, LiAsF$_6$ and LiBF$_4$ electrolyte separating the positive and negative electrodes from each other, wherein one of said positive and negative electrodes comprises a metal foil collector and an active material layer formed on at least a portion of said metal foil collector, said active material layer comprising a transition-metal lithium oxide and at least one cured reaction-curing binder, wherein said active material layer contains substantially no water.

10. A rechargeable battery according to claim 9, wherein said at least one cured reaction-curing binder comprises a thermoset binder.

11. A rechargeable battery according to claim 9, wherein said at least one cured reaction-curing binder comprises an ionizing-radiation-cured binder.

12. A rechargeable battery according to claim 9, wherein said at least one cured reaction-curing binder comprises a material from the groups consisting of: (i) a mixture of a thermoset binder and an ionizing-radiation-curing binder, and (ii) a thermoset binder having a molecular functional group that is reactive with ionizing radiation.

13. A rechargeable battery according to claim 9, wherein said nonaqueous liquid electrolyte consists essentially of a solution including a supporting electrolyte and a solvent.

14. A rechargeable battery according to claim 13, wherein said solvent comprises an aprotic organic solvent.

15. A rechargeable battery according to claim 13, wherein said supporting electrolyte comprises at least one component from the group consisting of LiPF$_6$, LiClO$_4$, LiAsF$_6$, and LiBF$_4$.

16. A lithium ion rechargeable battery comprising an electrode with a reaction-cured binder and a nonaqueous liquid electrolyte system, comprising:

a positive electrode comprising a metal foil collector and an active material layer formed on at least a portion of the metal foil collector of the positive electrode, the active material layer of the positive electrode comprising a transition-metal lithium oxide and at least one cured reaction-curing binder;

a negative electrode comprising a metal foil collector and an active material formed on at least a portion of the metal foil collector of the negative electrode, the active material layer of the negative electrode comprising a carbonaceous material and at least one cured reaction-curing binder; and a nonaqueous liquid electrolyte system consisting essentially of:

a solvent selected from the group consisting of ethylene carbonate, propylene carbonate, diethyl carbonate, 2-methyltetrahydrofuran, dimethyoxyethane, and mixtures thereof, and an electrolyte salt selected from the group consisting of $LiClO_4$, $LiPF_6$, $LiAsF_6$ and $LiBF_4$ separating the positive and negative electrodes from each other.

17. A rechargeable battery according to claim 16, wherein said nonaqueous liquid electrolyte consists essentially of a solution including a supporting electrolyte and a solvent.

18. A rechargeable battery according to claim 17, wherein said solvent comprises an aprotic organic solvent.

19. A rechargeable battery according to claim 17, wherein said supporting electrolyte comprises at least one component from the group consisting of $LiPF_6$, $LiClO_4$, $LiAsF_6$, and $LiBF_4$.

* * * * *